Patented Jan. 31, 1939

2,145,249

UNITED STATES PATENT OFFICE 2,145,249

DI-HALOGEN SUBSTITUTED α-(P-HYDROXYPHENYL)-α-AMINO-ACETIC ACID HYDROHALIDES OF THE SAME, AND PROCESSES FOR THEIR PRODUCTION

Otto Dalmer and John Niemann, Darmstadt, Germany, assignors to Merck & Co., Inc., Rahway, N. J., a corporation of New Jersey No Drawing. Original application July 10, 1934, Serial No. 734,510. Divided and this application September 18, 1936, Serial No. 101,410. In Germany August 23, 1933

9 Claims. (Cl. 260—518)

This is a division of application Serial No. 734,510, filed July 10, 1934, now Patent No. 2,085,009.

Our invention relates to antithyroidic compounds, and more particularly to compounds for use in counteracting abnormally increased basal metabolism.

Material increase in basal metabolism, a manifestation of Basedow's disease, results in rapid loss of weight, which often proves fatal, if left untreated. Basedow's disease is caused by hyperfunction of the thyroid gland, and its treatment is based on prevention of increase in basal metabolism.

Previous to our invention, di-iodo-tyrosine and dibromotyrosine were used in the treatment of Basedow's disease, but their antithyroidic effect was relatively low compared with the new compounds which constitute our invention.

It is, therefore, an object of our invention to provide compounds which, when administered in the proper manner, will tend to prevent increase in basal metabolism.

Some time ago, it was pointed out that di-iodotyrosine, which had thus far been regarded as having hypermetabolic action similar to thyroxin, the hormone of the thyroid gland, was really hypo-metabolic when given in small doses. Dibromtyrosine acts in a similar manner. These two substances have, in the meantime, proved beneficial in the treatment of Basedow's disease.

Small quantities of di-iodo-tyrosine occur naturally in the thyroid gland. Chemically, and probably genetically, as well, it is closely related to thyroxin and can, according to its physiological function, be regarded as an antagonist of thyroxin. Since the dibromo compound of tyrosine had also proved effective, indicating that the action appears to be linked with the tyrosine molecule, other iodine and bromine derivatives of tyrosine were prepared. However, pharmacological tests showed that the monobromotyrosine and the bromo-iodo-tyrosine (the latter thus far unknown) were without effect upon artificially increased basal metabolism.

It is, therefore, quite surprising that the iodo and bromo compounds respectively, of α-(p-hydroxyphenyl)-α-amino-acetic acid, prepared according to the present invention, show an antithyroidic effect not only equal to, but considerably exceeding that, of di-iodo-tyrosine.

It is notable that the primary substance for these new halogen compounds of α-(p-hydroxyphenyl)-α-amino-acetic acid does not occur naturally in the organism and presents an "unphysiological" grouping in the molecule (phenyl radical and amino groups in α-position to each other). It was not expected that such unphysiological compositions would have an antithyrodicic effect, and still less to be expected that they would be more effective than the other known substances, some of which occur naturally.

3,5 dibromo- and 3,5 di-iodo-α-(p-hydroxyphenyl)-α-amino-acetic acid are compounds thus far unknown, which decompose at 204° and 207°, respectively, when slowly heated, and split off halides. Their compositions correspond to the formulae: $C_8H_7O_3NBr_2$ and $C_8H_7O_3NI_2$.

The new compounds were tested pharmacologically on rats whose basal metabolism had been increased by daily administrations of thyroxin, 0.15 mg/kg. By simultaneous administration of an antithyroidic preparation, the effect of thyroxin can be more or less compensated, according to the effectiveness of the preparation. In the following table, the increases in basal metabolism are given, which were found on the 9th day of the experiment in the controls and test animals, treated daily with 50 mg. and 100 mg. of the substance (average values of at least three test animals).

Table

| Controls | Increase in basal metabolism | |
|---|---|---|
| | +25%; 50 mg. | +30%; 100 mg. |
| | Percent | Percent |
| Diiodo-tyrosine | +20 | +16 |
| Dibromo-tyrosine | +19 | +10 |
| Diiodo-α-(p-hydroxyphenyl)-α-amino-acetic acid | −2 | +3 |
| Dibromo-α-(p-hydroxyphenyl)-α-amino-acetic acid | +11 | +4 |

The superiority of the new compounds over the old ones is quite aparent.

The new group of compounds were obtained by treating α-(p-hydroxyphenyl)-α-amino-acetic acid with such a quantity of halogenating agent that two atoms thereof are introduced into the phenyl radical. It was found that halogenation may easily be performed, and, therefore, the ordinary methods described in the literature will serve the general purpose.

Nevertheless, it was found that especially pure products can be obtained with smooth reaction, if the halogenation is carried out in solutions made alkaline with sodium carbonate or bicarbonate, or in solutions of corresponding alkalinity. Weak alkalinity can, of course, also be attained by adding alkali gradually during the reaction. It was found also that the hydrochlorides, as well as hydrobromides of the new compounds, crystallize out of the acidulated reaction solution in a comparatively pure condition and are suitable for immediate further purification by ordinary means.

*Example 1*

25. grams of α-(p-hydroxyphenyl)-α-amino-acetic acid are dissolved in 100 cc. 2 n-soda solution and agitated with 7.6 grams of powdered iodine until a clear solution is obtained (about 30-40 min.). After the decoloration with charcoal, the solution is run into briskly agitated 10% hydrochloric acid. After a short time, the hydrochloride crystallizes out (50-60 grams) and can easily be converted into the free amino acid. The product occurs as a white powder of slightly bitter taste; the melting point is about 205° with decomposition.

*Example 2*

5 grams of α-(p-hydroxyphenyl)-α-amino-acetic acid are dissolved in about 100 cc. diluted alkali solution and gradually 10 grams of iodine monochloride are added. The precipitation is completed with the addition of acetic acid. The yield is about 7 grams of crude di-iodo-α-(p-hydroxyphenyl)-α-amino-acetic acid which can be purified by re-precipitation, for instance, with acetic acid from an ammoniacal solution of such crude acid, or by recrystallization, for instance, from diluted alcohol or diluted acetic acid, or through conversion into the hydrochloride.

*Example 3*

5 grams of α-(p-hydroxyphenyl)-α-amino-acetic acid are dissolved in about 100 cc. alkali solution and 15.3 grams of powdered iodine added gradually while cooling. After standing for several hours, the solution is acidulated. The crude yield is about 8 grams. Purification was made as above.

*Example 4*

5 grams of α-(p-hydroxyphenyl)-α-amino-acetic acid are dissolved in about 100 cc. diluted hydrochloric acid, adding 10 grams of iodine monochloride in several portions. After prolonged standing, the precipitate is separated. The yield is about 5 grams. Purification was made as above.

*Example 5*

2.5 grams α-(p-hydroxyphenyl)-α-amino-acetic acid in 100 ccm. of 10% soda solution is shaken up with 7.6 grams of powdered iodine until solution has been effected, and then filtered after short treatment with animal charcoal, and the reaction liquid is then poured into 100 ccm. of 11% solution of hydriodic acid. The hydriodide of di-iodo-α-(p-hydroxyphenyl)-α-amino-acetic acid is precipitated out. It melts under decomposition at 190-194° C.

*Example 6*

8.4 grams of α-(p-hydroxyphenyl)-α-amino-acetic acid are suspended in glacial acetic acid and a solution of 16 grams of bromine in glacial acetic acid added. After heating for 1 hour, the solution is allowed to cool, whereby the hydrobromide will crystallize out. The yield is 13-15 grams. By recrystallization from water, the hydro-bromide is purified; from it, the free amino acid is obtained in fine needles by the addition of sodium acetate to its aqueous solution.

Obviously, the various steps of the process may be modified considerably with respect to the order and the number of steps and the specific materials used in the several methods, without departing from the spirit of the invention substantially as described and claimed, and it is understood that we do not desire to limit ourselves to the specific embodiments shown in the foregoing examples.

We claim as our invention:

1. A process for producing di-halogen α-(p-hydroxyphenyl)-α-amino-acetic acid hydrohalides comprising treating α-(p-hydroxyphenyl)-α-amino-acetic acid with a halogenating agent and subsequently treating the reaction product with the desired acid.

2. A process for producing di-iodo-α-(p-hydroxyphenyl)-α-amino-acetic acid hydrochloride which comprises dissolving α-(p-hydroxyphenyl)-α-amino-acetic acid in 2 n-soda solution, agitating the mixture with iodine, decolorizing said mixture with charcoal, running said charcoal-treated mixture into hydrochloric acid, and permitting the hydrochloride to crystallize out.

3. A process for producing di-iodo-α-(p-hydroxyphenyl)-α-amino-acetic acid hydriodide which comprises shaking α-(p-hydroxyphenyl)-α-amino-acetic acid in soda solution with iodine, treating the mixture with charcoal, pouring said mixture into hydriodic acid, and permitting the hydriodide to precipitate out.

4. A process for producing di-bromo-α-(p-hydroxyphenyl)-α-amino-acetic acid hydrobromide which comprises suspending α-(p-hydroxyphenyl)-α-amino-acetic acid in glacial acetic acid, adding a solution of bromine in glacial acetic acid, heating the mixture for a protracted period, cooling said mixture, and permitting the hydrobromide to crystallize out.

5. Di-iodo-α-(p-hydroxyphenyl)-α-amino-acetic acid hydrochloride occurring as a white powder of slightly bitter taste and melting at 205-206° with decomposition.

6. Di-iodo-α-(p-hydroxyphenyl)-α-amino-acetic acid hydriodide, melting under decomposition at 190-194° C.

7. Di-bromo-α-(p-hydroxyphenyl)-α-amino-acetic acid hydrobromide characterized in that the free acid may be obtained from it in fine needles by the addition of sodium acetate to its aqueous solution.

8. The process for producing hydrohalides of di-halogen substituted α-(p-hydroxyphenyl)-α-amino-acetic acid which comprises reacting upon α-(p-hydroxyphenyl)-α-amino-acetic acid with a halogenating agent in such quantity that two atoms thereof are introduced into the phenyl radical, and subsequently treating the reaction product with a hydrohalogen acid, to produce the corresponding hydrohalide of the di-halogenated α-(p-hydroxyphenyl)-α-amino- acetic acid.

9. A di-halogen-α-(p-hydroxyphenyl)-α-amino-acetic acid hydrohalide.

OTTO DALMER.
JOHN NIEMANN.